(12) United States Patent
Shimozawa (10) Patent No.: US 10,837,503 B2
(45) Date of Patent: Nov. 17, 2020

(54) HYDRAULIC-OIL CONTROL DEVICE

(71) Applicant: ISUZU MOTORS LIMITED, Tokyo (JP)

(72) Inventor: Tomoaki Shimozawa, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 229 days.

(21) Appl. No.: 15/779,487

(22) PCT Filed: Nov. 22, 2016

(86) PCT No.: PCT/JP2016/084637
§ 371 (c)(1),
(2) Date: May 25, 2018

(87) PCT Pub. No.: WO2017/090624
PCT Pub. Date: Jun. 1, 2017

(65) Prior Publication Data
US 2018/0259013 A1    Sep. 13, 2018

(30) Foreign Application Priority Data

Nov. 26, 2015  (JP) ................................. 2015-230540

(51) Int. Cl.
*F16D 48/06* (2006.01)
*F16D 13/74* (2006.01)
(Continued)

(52) U.S. Cl.
CPC ........... *F16D 48/062* (2013.01); *F16D 13/74* (2013.01); *F16D 21/06* (2013.01); *F16D 25/10* (2013.01);
(Continued)

(58) Field of Classification Search
CPC ........ F16D 48/062; F16D 48/02; F16D 25/10; F16D 21/06; F16D 13/74;
(Continued)

(56) References Cited

U.S. PATENT DOCUMENTS

| 9,458,899 B2 | 10/2016 | Rothvoss et al. |
| 2007/0023250 A1 | 2/2007 | Mepham et al. |

(Continued)

FOREIGN PATENT DOCUMENTS

| CN | 1788170 A | 6/2006 |
| CN | 1984794 A | 6/2007 |

(Continued)

OTHER PUBLICATIONS

International Search Report and Written Opinion for related International Application No. PCT/JP2016/084627, dated Feb. 21, 2017; English translation of ISR provided; 9 pages.

(Continued)

*Primary Examiner* — Ernesto A Suarez
*Assistant Examiner* — Lillian T Nguyen
(74) *Attorney, Agent, or Firm* — Procopio, Cory, Hargreaves & Savitch LLP (57) ABSTRACT

Hydraulic-oil control devices are provided herein that perform hydraulic-oil supply control in a dual clutch device having a first clutch and a second clutch. A hydraulic-oil control device according to embodiments herein includes a first linear solenoid valve that adjusts hydraulic oil having a line pressure for a first hydraulic chamber and supplies the hydraulic oil thereto, a second linear solenoid valve that adjusts hydraulic oil having a line pressure for a second hydraulic chamber and supplies the hydraulic oil thereto, a shuttle valve that outputs the hydraulic oil having a higher pressure between the pressure of the hydraulic oil in the first hydraulic chamber and the pressure of the hydraulic oil in (Continued)

the second hydraulic chamber, and a switch valve that adjusts the amount of hydraulic oil supplied to a first space and a second space, according to the pressure of the hydraulic oil output from the shuttle valve.

9 Claims, 4 Drawing Sheets

(51) Int. Cl.
    *F16H 59/68* (2006.01)
    *F16D 48/02* (2006.01)
    *F16D 21/06* (2006.01)
    *F16D 25/10* (2006.01)
    *F16D 13/72* (2006.01)
    *F16D 25/12* (2006.01)
    *F16D 25/0638* (2006.01)

(52) U.S. Cl.
    CPC .............. *F16D 48/02* (2013.01); *F16H 59/68* (2013.01); *F16D 13/72* (2013.01); *F16D 25/0638* (2013.01); *F16D 25/12* (2013.01); *F16D 2021/0661* (2013.01); *F16D 2048/029* (2013.01); *F16D 2500/1027* (2013.01); *F16D 2500/1045* (2013.01); *F16D 2500/10412* (2013.01); *F16D 2500/30405* (2013.01); *F16D 2500/70406* (2013.01)

(58) Field of Classification Search
    CPC .... F16D 2048/029; F16D 25/12; F16D 13/72; F16D 2500/70406; F16D 2500/30405; F16D 2500/1045; F16D 2500/10412; F16D 2500/1027; F16D 2021/0661; F16D 25/0638; F16H 59/68
See application file for complete search history.

(56) References Cited

U.S. PATENT DOCUMENTS

| | | |
|---|---|---|
| 2008/0047799 A1 | 2/2008 | Combes et al. |
| 2008/0234099 A1* | 9/2008 | Gierer ................... F16D 48/04 477/79 |
| 2009/0131219 A1 | 5/2009 | Koopmann |
| 2011/0308912 A1 | 12/2011 | Kimura et al. |
| 2016/0305543 A1* | 10/2016 | Ichikawa ................ F16H 61/12 |
| 2017/0307068 A1* | 10/2017 | Takahashi ........... F16H 61/0206 |
| 2018/0363776 A1* | 12/2018 | Shimozawa ............ F16H 3/006 |

FOREIGN PATENT DOCUMENTS

| | | |
|---|---|---|
| CN | 101163901 A | 4/2008 |
| DE | 102005050493 A1 | 4/2007 |
| EP | 1522754 A1 | 4/2005 |
| JP | S58-053926 A | 4/1983 |
| JP | H05-149418 A | 6/1993 |
| JP | H05-296148 A | 11/1993 |
| JP | H08-014382 A | 1/1996 |
| JP | 2013-108576 A | 6/2013 |
| WO | 2010-103630 A1 | 9/2010 |

OTHER PUBLICATIONS

Office Action for related Chinese Patent Application No. 201680069233.4 dated Mar. 5, 2019, and corresponding machine English translation, in 12 pages.

Extended European Search Report for related EP App No. 16868567.5 dated May 27, 2019, 7 pgs.

* cited by examiner

HYDRAULIC-OIL CONTROL DEVICE

CROSS-REFERENCE TO RELATED APPLICATIONS

This application is a U.S. National Stage entry of PCT Application No: PCT/JP2016/084637 filed on Nov. 22, 2016, which claims priority to Japanese Patent Application No. 2015-230539, filed Nov. 26, 2015, and Japanese Patent Application No. 2015-230540, filed Nov. 26, 2015, the contents of which are incorporated herein by reference.

TECHNICAL FIELD

The present disclosure relates to a hydraulic-oil control device that controls supply of hydraulic oil in a dual clutch device including two clutches and enabling to switch a driving force transmission path from a driving source to a transmission between two systems.

BACKGROUND ART

In the related art, a dual clutch device is known which includes two clutches capable of disconnecting/connecting power transmission from a driving source such as an engine by a hydraulic pressure of hydraulic oil and which can switch a driving force transmission path from the driving source to a transmission between two systems.

Each clutch or the dual clutch device is, for instance, a multiplate wet clutch. In this dual clutch device, in order to remove heat generated at clutch plates constituting the clutch, hydraulic oil is supplied to a space around the clutch plates.

To control an amount of the hydraulic oil to be supplied to the space around the clutch plates, for instance, a linear solenoid valve is used.

For example, in a transmission including a main clutch that is arranged between a driving side and a driven side and a gear shift clutch that sets a gear shift stage inside the transmission, a technique is known which provides a lubrication adjusting valve for increasing a supply amount of a lubricant as a clutch control hydraulic pressure supplied to the main clutch increases (e.g., Patent Literature 1).

CITATION LIST

Patent Document

[Patent Literature 1]: JP-A-H05-149418

SUMMARY OF THE INVENTION

Technical Problem

In the dual clutch device, in the course of transitioning the clutch from disengagement to engagement, a state in which the clutch is engaged while sliding (a half-clutch state) lasts, and thus a large amount of frictional heat is generated. For this reason, to cool the clutch plates and the like, there is a need to increase a lubrication amount of the hydraulic oil.

For example, when an amount of the hydraulic oil for cooling the clutch plates is configured to be adjusted using the linear solenoid valve, there is a need to control the linear solenoid valve by a control unit according to states of the two clutches.

In this case, there are a problem that the linear solenoid valve should be provided, a problem that a process of acquiring the states of the two clutches to control the linear solenoid valve by the control unit should be performed, and a problem that costs are high.

Therefore, an aspect of the present disclosure is directed to providing a technique capable of supplying a proper amount of hydraulic oil to a space around clutch plates of each of two clutches with a simple configuration.

Solution to Problem

To achieve the above objective, a hydraulic-oil control device according to an aspect of the present disclosure is a hydraulic-oil control device that controls a supply of hydraulic oil to a first hydraulic chamber for disengaging and engaging a first clutch in a dual clutch device including the first clutch and a second clutch and enabling to switch a driving force transmission path from a driving source to a transmission to be switched between two systems, controls a supply of hydraulic oil to a second hydraulic chamber for disengaging and engaging the second clutch, and controls a supply of hydraulic oil to a first space around a first clutch plate of the first clutch and a second space around a second clutch plate of the second clutch, including:

a first linear solenoid valve configured to adjust hydraulic oil having a predetermined line pressure to supply the adjusted hydraulic oil to the first hydraulic chamber;

a second linear solenoid valve configured to adjust hydraulic oil having the line pressure to supply the adjusted hydraulic oil to the second hydraulic chamber;

a shuttle valve configured to output hydraulic oil having a higher pressure between a pressure of hydraulic oil in the first hydraulic chamber and a pressure of hydraulic oil in the second hydraulic chamber; and a hydraulic oil amount adjusting valve configured to adjust an amount of hydraulic oil supplied to the first space and the second space according to a pressure of hydraulic oil output from the shuttle valve.

In the hydraulic-oil control device, in a case where a pressure of the hydraulic oil output from the shuttle valve is within a predetermined range, the hydraulic oil amount adjusting valve may adjust the amount of hydraulic oil supplied to the first space and the second space to be increased as the pressure of the hydraulic oil is higher.

Further, in the hydraulic-oil control device, the hydraulic oil amount adjusting valve may be connected to a minimum amount pipe having a channel cross-sectional area that enables to supply a minimum amount required for lubrication in the first and second space, a maximum amount pipe having a channel cross-sectional area that enables to supply a maximum amount used for lubrication in the first and second space, and a lubricating pipe that communicates with the first space and the second space, and the hydraulic oil amount adjusting valve may switch a state in which the lubricating pipe and the minimum amount pipe are communicated with each other and a state in which the lubricating pipe and the maximum amount pipe are communicated with each other according to a pressure of the hydraulic oil output from the shuttle valve.

Further, the hydraulic-oil control device may further include a switch valve configured to switch whether or not hydraulic oil output from the shuttle valve is output to the hydraulic oil amount adjusting valve based on a control signal input to the switch valve.

In the hydraulic-oil control device, in a case where a pressure of the hydraulic oil output from the switch valve is within a predetermined range, the hydraulic oil amount adjusting valve may adjust, the amount of hydraulic oil supplied to the first space and the second space to be increased as the pressure of the hydraulic oil is higher.

Further, the hydraulic-oil control device may further include a lubrication control unit configured to output the control signal, which indicates whether or not the hydraulic oil is output to a downstream stage, to the switch valve.

Further, in the hydraulic-oil control device, in a case where a temperature of a clutch plate to be engaged out of the first clutch plate and the second clutch plate is a predetermined temperature or lower than the predetermined temperature, or is estimated to be a predetermined temperature or lower than the predetermined temperature, the lubrication control unit may output a control signal for controlling the hydraulic oil not to be output to a downstream stage, to the switch valve.

Further, in the hydraulic-oil control device, the lubrication control unit may estimate a temperature of the clutch plate to be engaged out of the first clutch plate and the second clutch plate based on predetermined information, and may output a control signal for controlling the hydraulic oil not to be output to a downstream stage in a case where an estimated temperature of the clutch plate is a predetermined temperature or lower than the predetermined temperature.

Further, in the hydraulic-oil control device, the lubrication control unit may pre-store a reference value of an elapsed time from a predetermined point in time until the temperature of the clutch plate becomes lower than or equal to the predetermined temperature after the first clutch and the second clutch are switched from a clutch disengaged state to a completely engaged state, estimate that a temperature of the clutch plate to be engaged is a predetermined temperature or lower than the predetermined temperature in a case of a lapse of the reference value of the elapsed time from the predetermined point in time, and output a control signal for controlling the hydraulic oil not to be output to a downstream stage.

Further, in the hydraulic-oil control device, the predetermined point in time may be a point in time at which the clutch to be engaged is ensured to be in the completely engaged state.

Advantageous Effects of the Invention

According to the present disclosure, a proper amount of hydraulic oil can be supplied to a space around clutch plates of each of two clutches with a simple configuration.

DESCRIPTION OF EMBODIMENTS

Hereinafter, a hydraulic-oil control device according to first and second embodiments of the present disclosure will be described based on the attached drawings. The same components are given the same reference signs, and names and functions thereof are the same. Therefore, detailed description thereof will not be repeated.

First Embodiment

Figure 1:
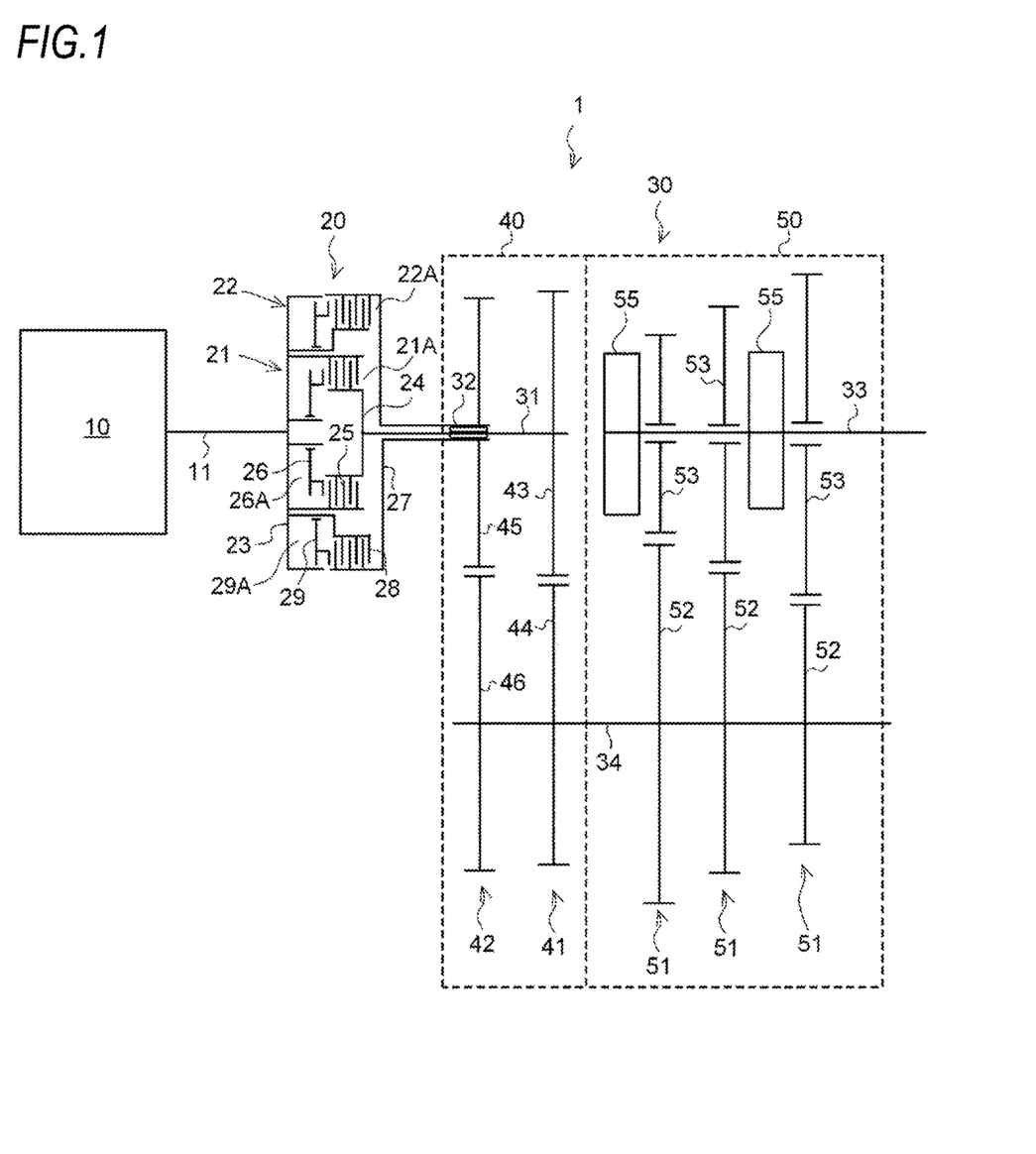
FIG. 1 is a schematic configuration diagram illustrating a dual clutch type transmission including a dual clutch device according to a first embodiment of the present disclosure.

FIG. 1 is a schematic configuration diagram illustrating a dual clutch type transmission including a dual clutch device according to a first embodiment of the present disclosure.

A dual clutch type transmission is connected to an output shaft 11 of an engine 10 that is a driving source.

The dual clutch type transmission 1 includes a dual clutch device 20 including first and second clutches 21 and 22, and a gear shift mechanism 30.

The first clutch 21 is, for instance, a multi plate wet clutch, and includes a clutch hub 23 that is rotated along with the output shaft 11 of the engine 10, a first clutch drum 24 that is rotated along with a first input shaft 31 of the gear shift mechanism 30, a plurality of first clutch plates 25, a first space 21A that surrounds the plurality of first clutch plates 25, a first piston 26 that comes into contact with the first clutch plates 25 under pressure, and a first hydraulic chamber 26A.

The first clutch 21 enters a connected state in which, when the first piston 26 is moved to an output side (in a right direction of FIG. 1) to make a stroke by a pressure of hydraulic oil supplied to the first hydraulic chamber 26A, the first clutch plates 25 are brought into contact under pressure and transmits torque. Meanwhile, when the pressure of the hydraulic oil of the first hydraulic chamber 26A is released, the first piston 26 is moved to an input side (in a left direction of FIG. 1) to make a stroke by a biasing force of a spring (not shown), and the first clutch 21 enters a disconnected state in which torque transmission is interrupted. In the following description, a state in which torque is transmitted via the first clutch plates 25 while the clutch hub 23 and the first clutch drum 24 are rotated at different engine speeds is referred to as a half-clutch state of the first clutch 21, and a state in which torque is transmitted via the first clutch plates 25 while the clutch hub 23 and the first clutch drum 24 are rotated at the same engine speed is referred to as a clutch engaged state or a completely engaged state of the first clutch 21. The hydraulic oil is supplied to the first space 21A in order to discharge frictional heat or the like that occurs at the first clutch plates 25.

The second clutch 22 is, for instance, multiplate wet clutch, and includes the clutch hub 23, a second clutch drum 27 that is rotated along with a second input shaft 32 of the gear shift mechanism 30, a plurality of second clutch plates 28, a second space 22A that surrounds the plurality of second clutch plates 28, a second piston 29 that comes into contact with the second clutch plates 28 under pressure, and a second hydraulic chamber 29A.

The second clutch 22 enters a connected state in which, when the second piston 29 is moved to the output side (in the right direction of FIG. 1) to make a stroke by a pressure of hydraulic oil supplied to the second hydraulic chamber 29A, the second clutch plates 28 are brought into contact under pressure and transmits torque. Meanwhile, when the pressure of the hydraulic oil is released, the second piston 29 is moved to the input side (in the left direction of FIG. 1) to make a stroke by a biasing force of a spring (not shown), and the second clutch 22 enters a disconnected state in which torque transmission is interrupted. In the following description, a state in which torque is transmitted via the second clutch plates 28 while the clutch hub 23 and the second clutch drum 27 are rotated at different engine speeds is referred to as a half-clutch state of the second clutch 22, and a state in which torque is transmitted via the second clutch plates 28 while the clutch hub 23 and the second clutch drum 27 are rotated at the same engine speed is referred to as a clutch engaged state or a completely engaged state of the second clutch 22. The hydraulic oil is supplied to the second space 22A in order to discharge frictional heat or the like that occurs at the second clutch plates 28. In the present embodiment, the first space 21A and the second space 22A communicate with each other, and the hydraulic oil is discharged through the first space 21A first, and then through the second space 22A.

The gear shift mechanism 30 includes a secondary gear shift section 40 that is disposed at the input side, and a primary gear shift section 50 that is disposed at the output side. The gear shift mechanism 30 includes first and second input shafts 31 and 32 that are provided in the secondary gear shift section 40, an output shaft 33 that is provided in the primary gear shift section 50, and a layshaft 34 that is disposed in parallel to these shafts 31 to 33. The first input shaft 31 is inserted into a hollow shaft that passes through the second input shall 32 in an axial direction in a relatively rotatable way. A propeller shaft coupled to vehicle drive wheels, all of which are not shown, via a differential device is connected to an output end of the output shaft 33.

A first splitter gear pair 41 and a second splitter gear pair 42 are provided in the secondary gear shift section 40. The first splitter gear pair 41 includes a first input main gear 43 that is fixed to the first input shaft 31, and a first input sub-gear 44 that is fixed to the layshaft 34 and is meshed with the first input main gear 43 at all times. The second splitter gear pair 42 includes a second input main gear 45 that is fixed to the second input shaft 32, and a second input sub-gear 44 that is fixed to the layshaft 34 and is meshed with the second input main gear 45 at all times.

A plurality of output gear pairs 51 and a plurality of synchronizing mechanisms 55 are provided in the primary gear shift section 50. Each output gear pair 51 includes an output sub-gear 52 that is fixed to the layshaft 34, and an output main gear 53 that is provided on the output shaft 33 in a relatively rotatable way and is meshed with the output sub-gear 52 at all times. Each synchronizing mechanism 55 has a well-known structure, and includes a dog clutch and the like, all of which are not shown. An operation of each synchronizing mechanism 55 is controlled by a control unit 90 to be described below, and is configured to selectively switch the output shaft 33 and the output main gear 53 in an engaged state (a gear-in state) or in a disengaged state (a neutral state) according to an accelerator opening degree detected by an accelerator opening sensor (not shown), a speed detected by a speed sensor (not shown), and the like. The number, an array pattern, etc. of the output gear pairs 51 or the synchronizing mechanisms 55 are not limited to the illustrated example, and can be appropriately modified without departing the spirit and idea of the present invention.

Next, a hydraulic-oil control device for supplying hydraulic oil to the first hydraulic chamber 26A, the second hydraulic chamber 29A, the first space 21A, and the second space 22A will be described.

Figure 2:
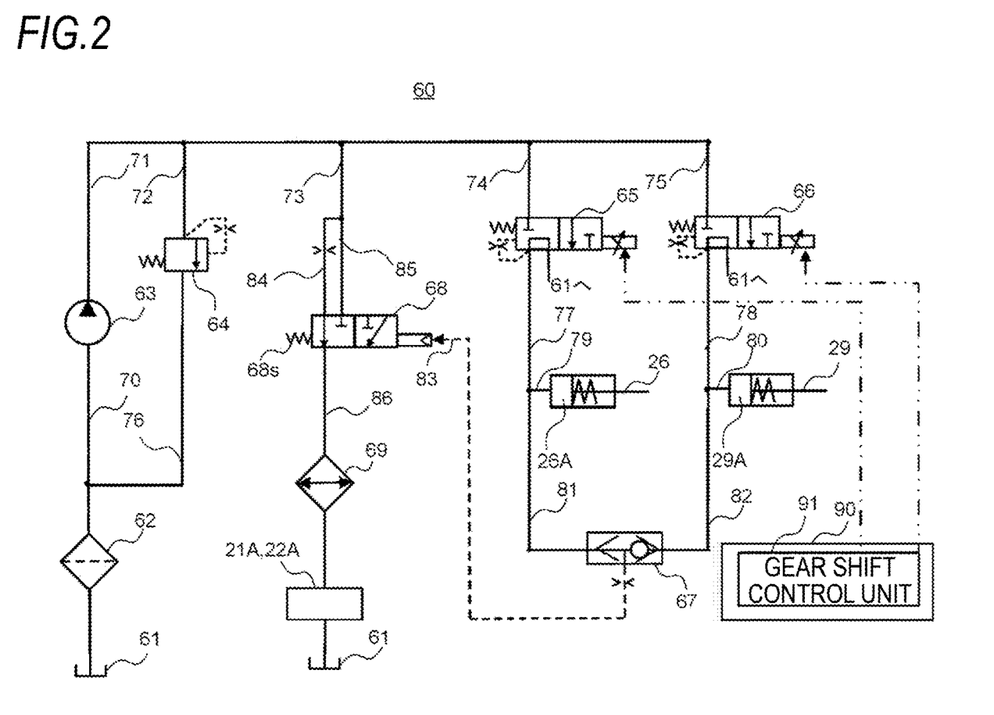
FIG. 2 is a configuration diagram of a hydraulic-oil control device according to the first embodiment of the present disclosure.

FIG. 2 is a configuration diagram of a hydraulic-oil control device according to a first embodiment of the present disclosure.

The hydraulic-oil control device 60 includes oil tanks 61, a filter 62, an oil pump 63, a relief valve 64, a first linear solenoid valve 65, a second linear solenoid valve 66, a first hydraulic chamber 26A, a second hydraulic chamber 29A, a shuttle valve 67, a switch valve 68 acting as an example of a valve for adjusting an amount of hydraulic oil, an oil cooler 69, a first space 21A, a second space 22A, pipes 70 to 86, and a control unit 90. In FIG. 2, a plurality of oil tanks 61 are illustrated, but those may be the same oil tank or different oil tanks.

The oil tanks 61 store hydraulic oil. The filter 62 removes impurities such as metal powder in the hydraulic oil that is supplied from the oil tank 61 to the oil pump 63. The oil pump 63 suctions the hydraulic oil from the oil tank 61 via the filter 62 through the pipe 70, and supplies the hydraulic oil to the pipe 71 downstream therefrom. In the present embodiment, the oil pump 63 is driven, for instance, by power of the engine 10.

The pipe 71 is ramified into, for instance, the pipes 72 to 75. The relief valve 64 is connected to the pipe 72. The relief valve 64 refluxes the hydraulic oil to the pipe 76 upstream therefrom when a pressure (a hydraulic pressure) of the hydraulic oil inside the pipe 72 is made higher than a predetermined line pressure that has been assumed. Therefore, a hydraulic pressure inside the pipes 72 to 75 can be maintained at a predetermined line pressure.

The pipe 73 is ramified to the pipe (the minimum amount pipe) 84 and the pipe (the maximum amount pipe) 85 downstream therefrom. A cross-sectional area of a chanter (a channel cross-sectional area) through which the hydraulic oil of the pipe 84 flows is a cross-sectional area through which minimum hydraulic oil to be supplied to the first space 21A and the second space 22A can flow. A cross-sectional area of a channel (a channel cross-sectional area) through which the hydraulic oil of the pipe 85 flows is a cross-sectional area through which maximum hydraulic oil to be supplied to the first space 21A and the second space 22A can flow.

The switch valve 68 is connected downstream front the pipes 84 and 85. The pipe (the lubricating pipe) 86 is connected to the switch valve 68. The switch valve 68 can switch a state in which the pipe 84 and the pipe 86 communicate with each other and a state in which the pipe 85 and the pipe 86 communicate with each other. A spring 68s that biases a spool (not shown) of the switch valve 68 in a direction in which the pipe 84 and the pipe 86 are caused to communicate with each other is connected to the vicinity of one end of the spool of the switch valve 68, and the pipe 83 to which a pilot pressure (a control hydraulic pressure) for pressing the spool in a direction in which the pipe 85 and the pipe 86 are caused to communicate with each other is supplied is connected to the vicinity of the other end of the spool.

With this configuration, when the pilot pressure from the pipe 83 is lower than a predetermined first pressure, the switch valve 68 causes the pipe 84 and the pipe 86 to communicate with each other, and makes the minimum hydraulic oil flowing along the pipe 84 flow to the pipe 86. However, when the pilot pressure from the pipe 83 is higher than or equal to the predetermined first pressure, the switch valve 68 causes the pipe 85 and the pipe 86 to communicate with each other, and an amount of the hydraulic oil flowing to the pipes 86 increases within a range of a maximum amount flowing along the pipe 85 depending on the pilot pressure within a range within which the pilot pressure is higher than or equal to a first pressure and is lower than or equal to a second pressure higher than the first pressure. When the pilot pressure from the pipe 83 is higher than the second pressure, the maximum hydraulic oil flowing along the pipe 85 is made to flow to the pipes 86. The first pressure and the second pressure can be adjusted by a configuration of the switch valve 68 (e.g., a spring constant of the spring 68s). For example, the second pressure may be made to be greater than or equal to an allowable maximum value of the pilot pressure. In this case, when the pilot pressure is higher than or equal to the first pressure, if the pilot pressure increases, an amount of the output hydraulic oil can be made to be increased.

The first space 21A and the second space 22A are connected downstream from the pipe 86 via the oil cooler 69. The oil cooler 69 cools the hydraulic oil flowing along the pipe 86. The hydraulic oil flows around the clutch plates 25 and 28 in the first and second spaces 21A and 22A, and absorbs heat generated at the clutch plates 25 and 28. The hydraulic oil flowing into the first and second spaces 21A and 22A is discharged to the oil tank 61.

The first linear solenoid valve 65 is connected downstream from the pipe 74. The first linear solenoid valve 65 is connected to the pipe 77. The first linear solenoid valve 65 adjusts an amount of the hydraulic oil that flows from the pipe 74 to the pipe 77, that is, is mainly supplied to the first hydraulic chamber 26A based on a control signal from a gear shift control unit 91 (to be described below), and adjusts a pressure of the first hydraulic chamber 26A.

The pipe 77 is ramified to the pipe 79 and the pipe 81. The pipe 79 is connected to the first hydraulic chamber 26A. The first piston 26 moves to make a stroke according to a pressure of the hydraulic oil in the first hydraulic chamber 26A. As the pressure of the hydraulic oil of the first hydraulic chamber 36A becomes higher, an engaged state of the first clutch 21 becomes strong. When the pressure of the hydraulic oil is higher than or equal to a predetermined pressure, the first clutch 21 enters a completely engaged state (a clutch engaged state). For this reason, it means that, as the pressure of the hydraulic oil of the first hydraulic chamber 26A is higher, the first clutch 21 is in a half-clutch state or enters the clutch engaged state via the half-clutch state. Thus, it can be determined that there is a possibility of much frictional heat being generated.

The pipe 81 is connected to one port of the shuttle valve 67. A pressure of the hydraulic oil flowing to the pipe 81 corresponds to the pressure of the hydraulic oil of the first hydraulic chamber 26A and a pressure of the hydraulic oil flowing along the pipe 77, that is, nearly the same pressure.

The second linear solenoid valve 66 is connected downstream from the pipes 75. The second linear solenoid valve 66 is connected to the pipe 78. The second linear solenoid valve 66 adjusts an amount of the hydraulic oil that flows from the pipe 75 to the pipe 78, that is, is mainly supplied to the second hydraulic chamber 29A, based on a control signal from the gear shift control unit 91 (to be described below).

The pipe 78 is ramified to the pipe 80 and the pipe 82. The pipe 80 is connected to the second hydraulic chamber 29A. The second piston 29 moves to make a stroke according to a pressure of the hydraulic oil in the second hydraulic chamber 29A. Here, as the pressure of the hydraulic oil of the second hydraulic chamber 29A becomes higher, an engaged state of the second clutch 22 becomes strong. When the pressure of the hydraulic oil is higher than or equal to a predetermined pressure, the second clutch 22 enters a completely engaged state (a clutch engaged state). For this reason, it means that, as the pressure of the hydraulic oil of the second hydraulic chamber 29A is higher, the second clutch 22 is in a half-clutch state or enters the clutch engaged state via the half-clutch state. Thus, it can be determined that there is a possibility of much frictional heat being generated.

The pipe 132 is connected to the other port of the shuttle valve 67. A pressure of the hydraulic oil flowing to the pipe 82 corresponds to the pressure of the hydraulic oil of the second hydraulic chamber 29A a pressure of the hydraulic oil flowing along the pipe 78, that is, nearly the same pressure.

As described above, the pipe 81 is connected to the one port of the shuttle valve 67, and the pipe 82 is connected to the other port of the shuttle valve 67. The pipe 83 for supplying the pilot pressure to the switch valve 68 is connected to an output port of the shuttle valve 67. The shuttle valve 67 outputs the hydraulic oil, which has a higher pressure between a pressure of the hydraulic oil flowing along the pipe 81 and a pressure of the hydraulic oil flowing along the pipe 82, to the pipe 83. To prevent a change between the pressure of the hydraulic oil of the pipe 81 and the pressure of the hydraulic oil of the pipe 82, a channel cross-sectional area of the pipe 83 is set to be smaller than those of the pipes 81 and 82.

According to the shuttle valve 67, the hydraulic oil, which has a higher internal pressure as a pilot pressure between a pressure of the hydraulic oil flowing along the pipe 81 (corresponding to an internal pressure of the first hydraulic chamber 26A) and a pressure of the hydraulic oil flowing along the pipe 82 (corresponding to an internal pressure of the second hydraulic chamber 29A), can be output to the switch valve 68 by the pipe 83. As a result, the switch valve 68 adjusts an amount of the hydraulic oil to be supplied to the first and second spaces 21A and 22A according to a higher pressure between the pressure of the first hydraulic chamber 26A and the pressure of the second hydraulic chamber 29A, that is, the pressure of the hydraulic chamber for the clutch having a possibility of much frictional heat. For this reason, the hydraulic oil having an amount suitable to discharge the frictional heat of the clutch plates (25 or 28) having a possibility of much frictional heat can be supplied to the first space 21A and the second space 22A.

The control unit 90 includes publicly known CPU or ROM, RAM, input port, output port, and the like because it performs various types of control on the engine 10, the dual clutch device 20, the gear shift mechanism 30, and the like. To perform these various types of control, sensor values of various sensors are input to the control unit 90.

The control unit 90 includes the gear shift control unit 91 acting as a partial functional element. The functional element will be described as being included in the control unit 90 that is integrated hardware in the present embodiment, but it may be provided for separate hardware.

The gear shift control unit 91 determines whether or not gear shift for changing an engaged clutch is required based on information about an accelerator opening degree from an accelerator opening sensor (not shown), a vehicle speed from a vehicle speed sensor, or the like. When it is determined that gear shift for changing an engaged clutch is required, the gear shift control unit 91 controls the clutch in a disengaged state by transmitting a control signal, which stops supply of the hydraulic oil to the hydraulic chamber (26A or 29A), to the linear solenoid valve (63 or 66) for supplying the hydraulic oil to one clutch (21 or 22) that is in an engaged state, and controls the clutch in an engaged state by transmitting a control signal, which initiates and increases supply of the hydraulic oil to the hydraulic chamber, to the linear solenoid valve for supplying the hydraulic oil to the other clutch that is in a disengaged state.

Next, an operation of the hydraulic-oil control device 60 will be described.

Here, an operation in the case in which the gear shift control unit 91 determines that gear shift for changing a clutch to be engaged is required will be described. Hereinafter, a case in which gear shift for changing engagement from the first clutch 21 to the second clutch 22 is required will be described by way of example. However, a case in which gear shift for changing engagement from the second clutch 22 to the first clutch 21 is required is the same as well.

The gear shift control unit 91 transmits a control signal, which stops supply of the hydraulic oil to the first hydraulic chamber 26A, to the first linear solenoid valve 65 that supplies the hydraulic oil to the first clutch 21 that is in an engaged state. Thereby, the first linear solenoid valve 65 releases communication between the pipe 74 and the pipe 77, and stops the supply of the hydraulic oil to the first hydraulic chamber 26A. In this case, the hydraulic oil inside the first hydraulic chamber 26A is discharged to the oil, tank 61 via the pipe 77 and the first linear solenoid valve 65, a pressure of the hydraulic oil inside the first hydraulic chamber 26A and the pipe 81 is reduced, and the first clutch 21 enters a clutch disengaged state.

Next, the gear shift control unit 91 controls operations of the synchronizing mechanisms 55 in the ease of gear shift in which there as a need to selectively switch the output shaft 33 and the output main gear 53 in an engaged state (a gear-in state) or in a disengaged state (a neutral state).

Next, the gear shift control unit 91 transmits a control signal, which initiates and increases supply of the hydraulic oil to the second hydraulic chamber 29A, to the second linear solenoid valve 66 that supplies the hydraulic oil to the second clutch 22 that is in a disengaged state. Thereby, the second linear solenoid valve 66 initiates communication between the pipe 75 and the pipe 78, and initiates the supply of the hydraulic oil to the second hydraulic chamber 29A. Afterward, the pressure of the hydraulic oil inside the second hydraulic chamber 29A and the pressure of the hydraulic oil of the pipe 82 increase gradually, and the second clutch 22 enters a clutch engaged state via a half-clutch state. Thereby, the gear shift is completed.

Alongside of the aforementioned operation, the shuttle valve 67 supplies the pipe 83 with the hydraulic oil having a higher hydraulic pressure between a hydraulic pressure of the first hydraulic chamber 26A (a hydraulic pressure of the pipe 81) and a hydraulic pressure of the second hydraulic chamber 29A (a hydraulic pressure of the pipe 82). The switch valve 68 adjusts and outputs an amount of the hydraulic oil to be supplied to the first space 21A and the second space 22A according to a hydraulic pressure of the hydraulic oil input from the pipe 83.

For example, when the second linear solenoid valve 66 initiates communication between the pipe 75 and the pipe 78 and initiates the supply of the hydraulic oil to the second hydraulic chamber 29A, the pressure of the hydraulic oil inside the second hydraulic chamber 29A and the pressure of the hydraulic oil of the pipe 82 increase gradually, and the second clutch 22 enters a clutch engaged state via a half-clutch state, and thus generates much frictional heat. In this case, since the shuttle valve 67 is configured to output the hydraulic oil of the pipe 82 whose pressure increases gradually to the pipe 83, the switch valve 68 increases an amount of the hydraulic oil within a maximum range, and supplies the hydraulic oil to the first space 21A and the second space 22A. For this reason, a lot of hydraulic oil flows to the second space 22A around the second clutch plates 28 of the second clutch 22 at which much frictional hear is generated, and thus the frictional heat stored in the second clutch plates 28 can be effectively discharged.

As described above, according to the hydraulic-oil control device 60 of the present embodiment, the hydraulic oil having a higher internal pressure as a pilot pressure between the internal pressure of the first hydraulic chamber 26A (the pressure of the hydraulic oil flowing along the pipe 81) and the internal pressure of the second hydraulic chamber 29A (the pressure of the hydraulic oil flowing along the pipe 82) is output to the switch valve 68 by the shuttle valve 67, and the amount of the hydraulic oil to be supplied to the first space 21A and the second space 22A is configured to be adjusted by the switch valve 68 according to the pressure of the hydraulic oil output from the shuttle valve 67. Thus, no linear solenoid valve is required to adjust the amount of the hydraulic oil to be supplied to the first space 21A and the second space 22A. In addition, there is no need to perform a special process of adjusting the hydraulic oil to be supplied to the first space 21A and the second space 22A in the control unit 90, and the amount of the hydraulic oil to be supplied to the first space 21A and the second space 22A can be adjusted to a proper amount.

Second Embodiment

A hydraulic-oil control device of a second embodiment will be described with reference to FIGS. 3 and 4A to 4C. However, the same elements as in the hydraulic-oil control device of the first embodiment will be given the same reference signs, and description thereof will be omitted.

Figure 3:
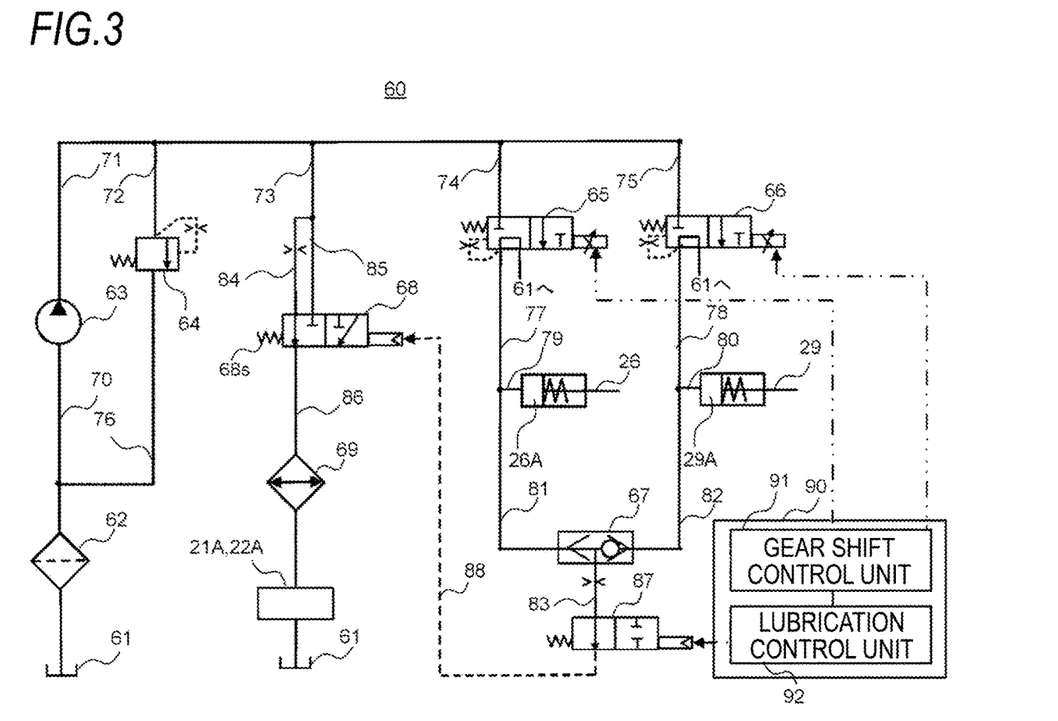
FIG. 3 is a configuration diagram of a hydraulic-oil control device according to a second embodiment.

As illustrated in FIG. 3, a hydraulic-oil control device 60 of the second embodiment further includes a switch valve 68 as an example of a hydraulic oil amount adjusting valve. A pipe 83 connected to an output port of a shuttle valve 67 is connected to a switch valve 87 to supply hydraulic oil to the switch valve 87.

A pipe 88 led to the switch valve 68 is connected to an output side of the switch valve 87. The switch valve 87 is, for instance, an electromagnetic switch valve, and can be switched between a state in which the pipe 83 and the pipe 88 communicate with each other and a state in which the pipe 83 and the pipe 88 are interrupted according to a control signal of a lubrication control unit 92 to be described below. In the present embodiment, the switch valve 87 is configured to output the hydraulic oil flowing along the pipe 83 to the pipe 88 of a downstream stage with no change with the pipe 83 caused to communicate with the pipe 88 when the control signal is ON, and to interrupt the pipe 83 and the pipe 88 when the control signal is OFF such that the hydraulic oil does not flow to the pipe 88.

As a result, when the control signal toward the switch valve 67 is ON, a higher pressure between a pressure of a first hydraulic chamber 26A and a pressure of a second hydraulic chamber 29A, that is, a pressure of the hydraulic chamber for a clutch having a possibility of much frictional heat is supplied to the switch valve 68 by the pipe 88 as a pilot pressure, and thus the switch valve 68 adjusts an amount of hydraulic oil to be supplied to first and second spaces 21A and 22A according to the pressure of the hydraulic chamber for the clutch having a possibility of much frictional heat. For this reason, the hydraulic oil having an amount suitable to discharge frictional heat of climb plates (25 or 28) having a possibility of much frictional heat can be supplied to the first space 21A and the second space 22A.

On the other hand, when the control signal toward the switch valve 87 is OFF, the hydraulic oil is not supplied to the switch valve 68 by the pipe 68, and thus the switch valve 68 supplies minimum hydraulic oil to the first and second spaces 21A and 22A. In this way, when the control signal toward the switch valve 87 is OFF, an amount of the hydraulic oil to be supplied via the switch valve 68 can be reduced. Thus, power required to operate an oil pump 63 for maintaining the hydraulic oil at a line pressure can be reduced, and a loss of energy can be reduced.

A control unit 90 further includes the lubrication control unit 92 acting as a partial functional element as an example of a lubrication control unit.

The lubrication control unit 92 outputs a control signal to the switch valve 87. When it is determined that gear shift for changing an engaged clutch is required, the lubrication control unit 92 outputs the control signal to the switch valve 87 as ON. When a temperature of clutch plates of a clutch to be engaged is a predetermined temperature (e.g., a temperature of hydraulic oil of an oil tank 61) or lower than the predetermined temperature, or can be estimated to be a predetermined temperature or the predetermined temperature, this means that there is little cooling effect caused by increasing and supplying an amount of the hydraulic oil after that, and thus the lubrication control unit 92 outputs the control signal to the switch valve 87 as OFF such that the hydraulic oil is not output to a downstream stage of the switch valve 87. Therefore, when there is little cooling effect, a supply amount of the hydraulic oil can be reduced by the switch valve 68, and a wasteful loss of energy can be reduced.

Here, the temperature of the clutch plates of the clutch to be engaged may be configured to provide, for instance, a sensor for measuring the temperature of the clutch plates, and to be acquired by a value (information) of the sensor.

In addition, the temperature of the clutch plates of the clutch to be engaged may be configured to prepare an algorithm for estimating the temperature of the clutch plates for any variable (e.g., a time from the start of engagement of the clutch, a temperature of hydraulic oil around the clutch plates, etc.), for instance, by performing an experiment, and to estimate the temperature of the clutch plates using the algorithm.

A case in which the temperature of the clutch plates of the clutch to be engaged can be estimated not to be higher than a predetermined temperature may be, for instance, a case in which a time until the clutch enters a completely engaged state after engagement of the clutch is initiated with the switch valve 87 set to ON and the temperature of the clutch plates becomes lower than or equal to the predetermined temperature is measured by an experiment, an elapsed time until the temperature of the clutch plates becomes lower than or equal to the predetermined temperature from a predetermined point in time after the engagement of the clutch is initiated is acquired as a reference time (a cooling reference time) in advance, and the cooling reference time elapsed after the lubrication control unit 92 detects the predetermined point in time. The predetermined point in time after the engagement of the clutch is initiated may be a point in time when it is ensured that the clutch is in a completely engaged state, for instance, a point in time when an indicated pressure for the hydraulic chamber reaches an assumed maximum pressure.

Next, an operation of the hydraulic-oil control device 60 will be described.

Here, an operation in the case in which a gear shift control unit 91 determines that gear shift for changing a clutch to be engaged is required will be described. Hereinafter, a case in which gear shift for changing engagement from a first clutch 21 to a second clutch 22 is required will be described by way of example. However, a case in which gear shift for changing engagement from the second clutch 22 to the first clutch 21 is required is the same as well.

The gear shift control unit 91 transmits a control signal, which stops supply of the hydraulic oil to the first hydraulic chamber 6A, to a first linear solenoid valve 65 that supplies the hydraulic oil to the first clutch 21 that is in an engaged state. Thereby, the first linear solenoid valve 65 releases communication between a pipe 74 and a pipe 77, and stops the supply of the hydraulic oil to the first hydraulic chamber 26A. In this case, the hydraulic oil inside the first hydraulic chamber 26A is discharged to the oil tank 61 via the pipe 77 and the first linear solenoid valve 65, a pressure of the hydraulic oil inside the first hydraulic chamber 26A and a pipe 81 is reduced, and the first clutch 21 enters a clutch disengaged state.

Next, the gear shift control unit 91 controls operations of synchronizing mechanisms 55 in the case of gear shift in which there is a need to selectively switch an output shaft 33 and an output main gear 53 in an engaged state (a gear-in state) or in a disengaged state to neutral state).

Next, the gear shift control unit 91 transmits a control signal, which initiates and increases supply of the hydraulic oil to the second hydraulic chamber 29A, to a second linear solenoid valve 66 that supplies the hydraulic oil to the second clutch 22 that is in a disengaged state. Thereby, the second linear solenoid valve 66 initiates communication between a pipe 75 and a pipe 78, and initiates the supply of the hydraulic oil to the second hydraulic chamber 29A. Afterward, the pressure of the hydraulic oil inside the second hydraulic chamber 29A and a pressure of hydraulic oil of a pipe 82 increase gradually, and the second clutch 22 enters a clutch engaged state via a half-clutch state. Thereby, the gear shift is completed.

Alongside of the aforementioned operation, the lubrication control unit 92 sets a control signal to be ON, and outputs a control signal to the switch valve 87. Thereby, the switch valve 87 is configured to output the hydraulic oil flowing along the pipe 83 to the pipe 88 of a downstream stage with no change with the pipe 83 caused to communicate with the pipe 88. The shuttle valve 67 supplies the pipe 83 with the hydraulic oil having a higher hydraulic pressure between a hydraulic pressure of the first hydraulic chamber 26A (a hydraulic pressure of the pipe 81) and a hydraulic pressure of the second hydraulic chamber 29A (a hydraulic pressure of the pipe 82). The switch valve 87 outputs the hydraulic oil of the pipe 83 to the pipe 88 with no change. The switch valve 68 adjusts and outputs an amount of the hydraulic oil to be supplied to the first space 21A and the second space 22A according to a hydraulic pressure of the hydraulic oil input from the pipe 88.

For example, when the second linear solenoid valve 66 initiates communication between the pipe 75 and the pipe 78 and initiates the supply of the hydraulic oil to the second hydraulic chamber 29A, the pressure of the hydraulic oil inside the second hydraulic chamber 29A and the pressure of the hydraulic oil of the pipe 82 increase gradually, and the second clutch 22 enters a clutch engaged state via a half-clutch state, and thus generates much frictional heat, in this case, since the shuttle valve 67 is configured to output the hydraulic oil of the pipe 82 whose pressure increases gradually to the pipe 83, the switch valve 68 increases an amount of the hydraulic oil within a maximum range, and supplies the hydraulic oil to the first space 21A and the second space 22A. For this, reason, a lot of hydraulic oil flows to the second space 22A around second clutch plates 28 of the second clutch 22 at which much frictional heat is generated, and thus the frictional heat stored in the second clutch plates 28 can be effectively discharged.

Next, a timing at which the control signal to the switch valve 87 is set to OFF, and an effect of setting the control signal of the switch valve 87 to OFF will be described.

Figure 4A:
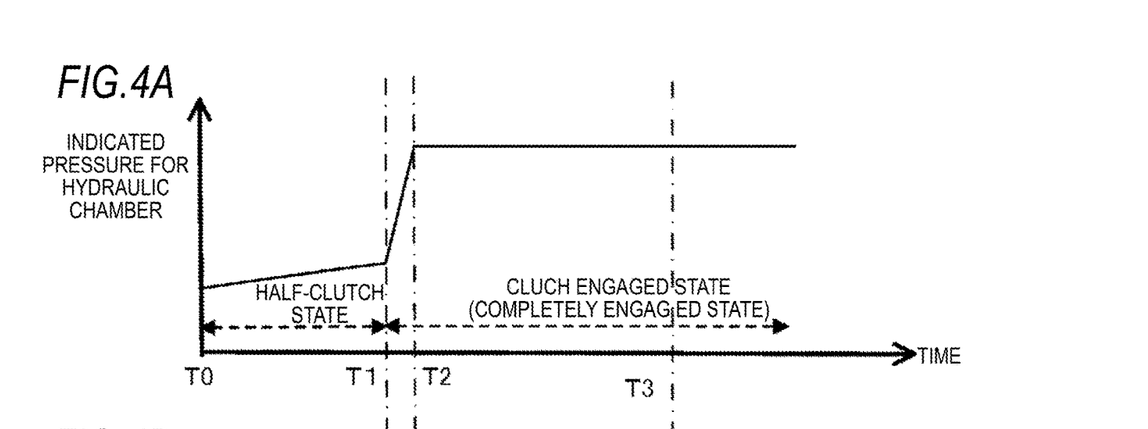
FIG. 4A is a diagram illustrating a change in indicated pressure for a hydraulic chamber according to a second embodiment.
Figure 4B:
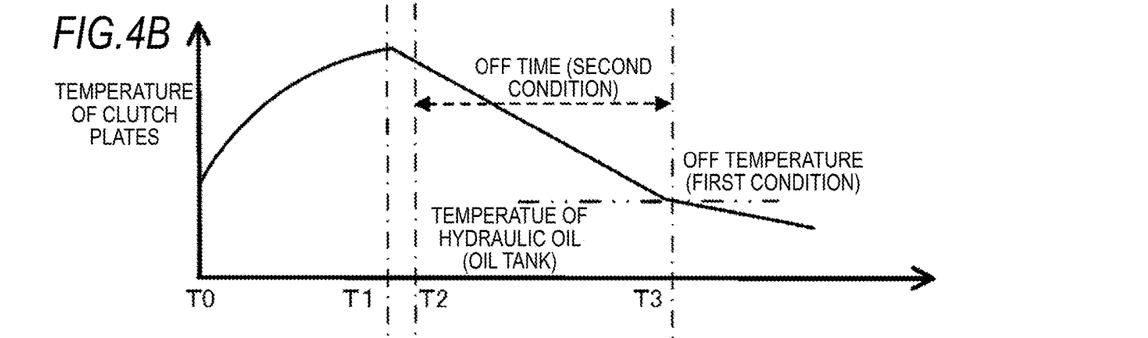
FIG. 4B is a diagram illustrating a change in temperature of clutch plates.
Figure 4C:
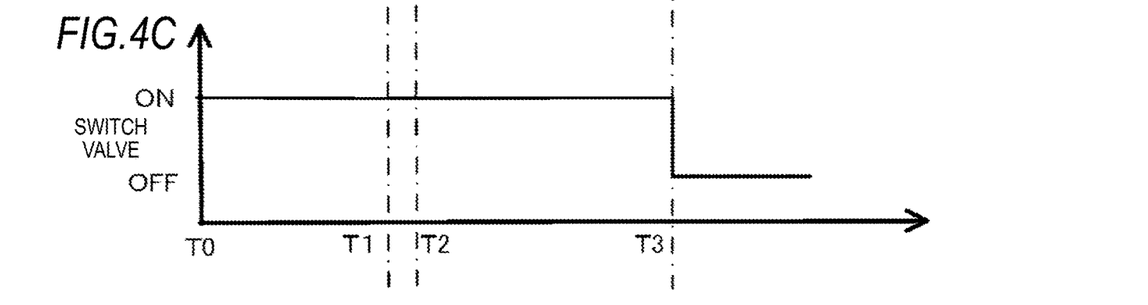
FIG. 4C is a diagram illustrating an ON/OFF state of a switch valve.

FIG. 4A is a diagram illustrating a change in indicated pressure for a hydraulic chamber according to a second embodiment of the present disclosure, FIG. 4B is a diagram illustrating a change is temperature of clutch plates, and FIG. 4C is a diagram illustrating an ON/OFF state of a switch valve.

When the clutch (21 or 22) to be engaged is engaged, the gear shift control unit 91 outputs the control signal to the linear solenoid valve (65 or 66) for adjusting the hydraulic oil to be supplied to the hydraulic chamber such that the pressure of the hydraulic chamber (26A or 29A) of the clutch at the engagement side has an indicated pressure illustrated in FIG. 4A. To be specific, the gear shift control unit 91 initiates supply of the hydraulic oil using the linear solenoid valve (65 or 66) (time T0), sets the clutch to a half-clutch state, and gradually raises the pressure of the hydraulic chamber to change the clutch from a half-clutch state to a completely engaged state (time T1). Next, the gear shift control unit 91 raises the pressure of the hydraulic chamber in a completely engaged state to an assumed maximum pressure (time T2), and then the gear shift control unit 91 maintains the pressure of the hydraulic chamber.

When control caused by the gear shift control, unit 91 is performed, the temperature of the clutch plates of the clutch to be engaged is gradually increased from time T0 to time T1 for which the half-clutch state lasts as illustrated in FIG. 4B because much frictional heat is generated between the clutch plates. At time T1, when the clutch enters a completely engaged state (time T1), the clutch plates, are integrally rotated, and thus the generation of the frictional heat between the clutch plates is prevented. Thus, the temperature of the clutch plates is reduced by a lot of hydraulic oil supplied around the clutch plates (times T1 to T3).

For example, when an estimated temperature of the clutch plates is matched with a predetermined temperature (a temperature of the hydraulic oil of the oil tank 61) (a first condition of FIG. 4B) or when the cooling reference time elapsed from time T2 at which the pressure of the hydraulic chamber reaches an assumed maximum pressure (a second condition of FIG. 4B), the temperature of the clutch plates can be estimated to be sufficiently cooled, and thus the lubrication control unit 92 switches the control signal toward the switch valve 87 to OFF and outputs the switched control signal. Thereby, the switch valve 87 interrupts the pipe 83 and the pipe 88 to prevent the hydraulic oil from flowing to the pipe 88. As a result, the switch valve 68 supplies minimum hydraulic oil to the first and second spaces 21A and 22A. In this way, when the cooling of the clutch plates is not required that much, an amount of the hydraulic oil to be supplied via the switch valve 68 can be reduced, so that power required for an operation of the oil pump 63 by which the hydraulic oil is maintained at a line pressure can be reduced, and a loss of energy can be reduced.

As described above, according to the hydraulic-oil control device 60 of the present embodiment, the hydraulic oil having a higher internal pressure as a pilot pressure between the internal pressure of the first hydraulic chamber 26A (the pressure of the hydraulic oil flowing along the pipe 81) and the internal pressure of the second hydraulic chamber 29A (the pressure of the hydraulic oil flowing along the pipe 82) is output to the switch valve 68 by the shuttle valve 67, and the amount of the hydraulic oil to be supplied to the first space 21A and the second space 22A configured to be adjusted by the switch valve 68 according to the pressure of the hydraulic oil output from the shuttle valve 67. Thus, no linear solenoid valve is required to adjust the amount of the hydraulic oil to be supplied to the first space 21A and the second space 22A. In addition, there is no need to perform a special process of adjusting the hydraulic oil supplied to the first space 21A and the second space 22A in the control unit 90, and the amount of the hydraulic oil to be supplied to the first space 21A and the second space 22A can be adjusted to a proper amount.

Further, when the cooling of the clutch plates is not relatively required by providing the switch valve 87 on a downstream stage of the shuttle valve 67, the amount of the hydraulic oil to be supplied to the first space 21A and the second space 22A via the switch valve 68 is configured to be controlled to a minimum amount by preventing the hydraulic oil output from the shuttle valve 67 from being supplied to the switch valve 68, so that power required for an operation of the oil pump 63 by which the hydraulic oil is maintained at a line pressure can be reduced, and a loss of energy can be reduced.

The present disclosure is not limited to the aforementioned embodiments, and can be carried out by appropriate modification without departing the spirit and idea of the present disclosure.

For example, in the aforementioned embodiments, the example in which the first space 21A and the second space 22A communicate with each other has been illustrated, but the present disclosure is not limited thereto. The first space 21A and the second space 22A may not communicate with each other. In this case, a constituent group (e.g., the pipe 73, the pipe 84, the pipe 85, the switch valve 68, the pipe 86, the oil cooler 69, etc.) for adjusting the hydraulic oil to be supplied with respect to each of the first space 21A and the second space 22A needs only to be provided.

This application is based on Japanese Patent Applications No. 2015-230540 filed on Nov. 26, 2015 and No. 2015-230539 filed on Nov. 26, 2015, the contents of which are incorporated herein by reference.

INDUSTRIAL APPLICABILITY

According to the present disclosure, it is useful in that a proper amount of hydraulic oil can be supplied to a space around clutch plates of each of two clutches.

LIST OF REFERENCE NUMERALS

1 Dual clutch type transmission
10 Engine
11 Output shaft
20 Dual clutch device
21 First clutch
21A First space
22A Second space
22 Second clutch
26, 29 Piston
26A First hydraulic chamber
29A Second hydraulic chamber
30 Gear shift mechanism
65 First linear solenoid valve
66 Second linear solenoid valve
67 Shuttle valve
68 Switch valve
87 Switch valve

The invention claimed is:

1. A hydraulic-oil control device that controls supply of hydraulic oil to a first hydraulic chamber for disengaging and engaging a first clutch in a dual clutch device including the first clutch and a second clutch and enabling to switch a driving force transmission path from a driving source to a transmission to be switched between two systems, controls supply of hydraulic oil to a second hydraulic chamber for disengaging and engaging the second clutch, and controls supply of hydraulic oil to a first space around a first clutch plate of the first clutch and a second space around a second clutch plate of the second clutch, comprising:
 a first linear solenoid valve configured to adjust hydraulic oil having a predetermined line pressure to supply the adjusted hydraulic oil to the first hydraulic chamber;
 a second linear solenoid valve configured to adjust hydraulic oil having the line pressure to supply the adjusted hydraulic, oil to the second hydraulic chamber;
 a shuttle valve configured to output hydraulic oil having a higher pressure between a pressure of hydraulic oil in the first hydraulic chamber and a pressure of hydraulic oil in the second hydraulic chamber; and
 a hydraulic oil amount adjusting valve configured to adjust an amount of hydraulic oil supplied to the first space and the second space according to a pressure of hydraulic oil output from the shuttle valve; wherein the hydraulic oil amount adjust inn valve is connected to a minimum amount pipe having a channel cross-sectional area that enables to supply a minimum amount required for lubrication in the first and second space, a maximum amount pipe having a channel cross-sectional area that enables to supply a maximum amount used for lubrication in the first and second space, and a lubricating pipe that communicates with the first space and the second space, and the hydraulic oil amount adjusting valve switches a state in which the lubricating pipe and the minimum amount pipe are communicated with each other and a state in which the lubricating pipe and the maximum amount pipe are communicated with each other according to the pressure of the hydraulic oil output from the shuttle valve.

2. The hydraulic-oil control device according to claim 1, wherein in a case where the pressure of the hydraulic oil output from the shuttle valve is within a predetermined range, the hydraulic oil amount adjusting valve adjusts the amount of hydraulic oil supplied to the first space and the second space to be increased as the pressure of the hydraulic oil output from the shuttle valve is higher.

3. The hydraulic-oil control device according to claim 1, further comprising:
 a switch valve configured to switch whether or not hydraulic oil output from the shuttle valve is output to the hydraulic oil amount adjusting valve based on a control signal input to the switch valve.

4. The hydraulic-oil control device according to claim 3, wherein in a case where a pressure of the hydraulic oil output from the switch valve is within a predetermined range, the hydraulic oil, amount adjusting valve adjusts the amount of hydraulic oil supplied to the first space and the second space to be increased as the pressure of the hydraulic oil output from the shuttle valve is higher.

5. The hydraulic-oil control device according to claim 4, further comprising
 a lubrication control unit configured to output a control signal, which indicates whether or not the hydraulic oil is output to a downstream stage, to the switch valve.

6. The hydraulic-oil control device according to claim 5, wherein in a case where a temperature of the of first clutch plate or the second clutch plate to be engaged is a predetermined temperature or lower than the predetermined temperature, or is estimated to be the predetermined temperature or lower than the predetermined temperature, the lubrication control unit outputs the control signal for controlling the hydraulic oil not to be output to the downstream stage, to the switch valve.

7. The hydraulic-oil control device according to claim 6, wherein the lubrication control unit estimates the temperature of, the first clutch plate or the second clutch plate to be engaged based on predetermined information, and outputs the control signal for controlling the hydraulic oil not to be output to the downstream stage in the case where an estimated temperature of the clutch plate is the predetermined temperature or lower than the predetermined temperature.

8. The hydraulic-oil control device according to claim 6, wherein the lubrication control unit pre-stores a reference value of an elapsed time from a predetermined point in time until temperatures of the first clutch and the second clutch become lower than or equal to the predetermined temperature after the first clutch and the second clutch are switched from a disengaged state to a completely engaged state, estimates that the temperature of the first clutch plate or the second clutch plate to be engaged is the predetermined temperature or lower than the predetermined temperature in a case of a lapse of the reference value of the elapsed time from the predetermined point in time, and outputs as the control signal for controlling the hydraulic oil not to be output to the downstream stage.

9. The hydraulic-oil control device according to claim 8, wherein the predetermined point in time is a point in time at which the first clutch plate or the second clutch plate to be engaged is ensured to be in the completely engaged state.

* * * * *